United States Patent Office 3,261,666

Patented July 19, 1966

1

3,261,666

METHOD OF PRODUCING NITRIDES OF ALUMINUM AND BORON

Benjamin J. Luberoff, Monsey, Robert N. Rickles, Riverdale, and Robert W. Stuchell, Elmhurst, N.Y., assignors to Stauffer Chemical Company, New York, N.Y., a corporation of Delaware No Drawing. Filed May 8, 1962, Ser. No. 193,324

5 Claims. (Cl. 23—191)

This invention relates to the production of elemental nitrides, the element of which falls in Group IIIA of the Periodic Table. The invention is particularly concerned with boron nitride and a method of preparing it.

Boron nitride is a substance which is familiar to the chemical and related arts. Normally obtained in the form of a white or gray powder having a soapy or greasy feel, boron nitride possesses unusual and interesting properties. For example, its exeremely high melting point of 3000° C. has been utilized in producing a refractory material from which can be manufactured crucibles and various ceramic supports and coatings capable of withstanding exceedingly high temperatures. Another distinguishing feature of boron nitride is its low coefficient of friction which combined with superior heat resistance renders the material eminently suitable as a solid high temperature lubricant similar to graphite. In fact, boron nitride is sometimes referred to as white graphite.

Because of its outstanding refractory properties great interest is being shown in boron nitride by the newer technologies, particularly atomic energy and space research, and efforts are being intensified in these fields to develop new and usable forms of this interesting material.

Numerous processes are known for obtaining boron nitride, typical of which is the one described in U.S.P. 1,135,232 to Weintraub. According to the specification of this patent, the reaction is carried out at 2000° C., a temperature which is sufficient to sublime or boil away the reaction by-products while leaving the high melting boron nitride as a residue.

Whereas the Weintraub process is applicable to the production of small quantities of boron nitride, it presents difficulties in large scale operations. For instance the volatilization of large quantities of highly corrosive by-products is objectionable since the furnace or reaction vessel rapidly becomes clogged and corroded. Moreover, there is a distinct explosion hazard involved due to the further breakdown of the initially formed sodium oxide by-product into sodium peroxide and elemental sodium. Manifestly, materials of this sort would be exceedingly troublesome to remove and safely handle in a commercial undertaking.

A modification of the Weintraub procedure is that of Kamlet in U.S.P. 2,839,366, which proposes conducting the reaction at lower temperatures and in the presence of a large excess of boric oxide. Isolation of the boron nitride is effected by leaching the reaction mixture in order to remove the residual by-products. The surplus boric oxide is essential to maintain a mild alkalinity in order to prevent hydrolysis of the boron nitride during the leaching step.

Although the procedure as advocated in the Kamlet patent minimizes the formation of the highly inflammable and dangerous sodium peroxide, the utilization of abundant quantities of boric oxide is economically undesirable since it is a relatively expensive raw material for commercial operations.

It has now been discovered that the reaction of boric oxide and metallic cyanides to produce boron nitride is greatly improved and facilitated by carrying out the reaction in the presence of silica and the provision of such

2 a process constitutes the primary purpose and object of this invention. Other objects and purposes will become apparent as the description proceeds.

In accordance with the present invention, we prepare boron nitride in excellent yields by reacting boron oxide or an oxidic equivalent thereof with a basic metal cyanide or cyanamide in the presence of silica while maintaining the reaction at a temperature which is sufficient to effect formation of the boron nitride but is nevertheless below the vaporization temperature of the alkaline reaction by-products. In general, it has been ascertained that excellent results are achieved by reacting 1 to 4 moles of an alkaline earth or alkali earth metal cyanide with one mole of boric oxide and from 0.9 to 4 moles of silica at a temperature ranging from about 800° C. to 1350° C., the yield of boron nitride falling within the range of about 75 to 100%. The reactants are blended together in a suitable vessel such as a nickel crucible and heated by any convenient method to the desired temperature until the evolution of carbon monoxide has ceased. After cooling, the reaction mixture is finely ground and leached with boiling water to dissolve out the soluble components. The residual boron nitride is then filtered off. If desired, it may be fired at 2000° C. under nitrogen in order to remove minute traces of volatile impurities.

The term "basic metal" as used herein refers to those metals, the hydroxides of which are appreciably soluble in water and which furthermore exhibit a basic reaction in aqueous media, i.e., the pH of the aqueous solution exceeds 7. The aforesaid basic metals are normally thought of as constituting the alkaline earth and alkali metal series since the hydroxides of these particular elements react on the alkaline side. As understood herein, "alkaline earth metals" include calcium, barium and strontium; "alkali earth metal series" means lithium, sodium and potassium. The preferred basic metals are calcium and sodium since the borates and aluminates thereof are readily accessible and moreover are the least costly.

Exemplary basic metal cyanides and cyanamides which are suitable for practicing the invention include sodium cyanide, potassium cyanide, lithium cyanide, potassium cyanamide, sodium cyanamide, calcium cyanide, calcium cyanamide, barium cyanamide, and the like.

It is to be especially pointed out that the process of the present invention is not limited to boric oxide but can be carried out with other oxidic derivatives such as metallic borates. In this respect, our process represents a drastic departure from the prior art methods as typified by Weintraub and Kamlet which will not operate with metallic borates. The present invention by opening up a greater selection of boron raw materials represents a distinct and important departure from the teachings of the prior art.

By resorting to the use of a third component, i.e., silica, the reaction between boric oxide and the cyanide salt to produce boron nitride can be carried out on a stoichiometric basis. This is especially important for commercial operations since the necessity of employing a large excess of expensive boric oxide as hitherto required is thereby eliminated. Further advantages occasioned by using silica can be attributed to its tendency to retard volatilization of objectionable by-products and its promotion of a mild alkaline environment when the reaction residue is leached to remove the boron nitride.

As previously pointed out, our process is not limited to boric oxide but can be effected by other oxidic derivatives, and in this connection mention is made of the borates of basic metals of which typical examples are sodium tetraborate, calcium borate, colmanite (a calcium borate), kernite (a sodium tetraborate), pandermite (a calcium borate). The invention also contemplates the utilization of borate salts containing more than one basic metal as exemplified by kramerite and ulexite which are calcium sodium borates. Manifestly, other anhydrous borate salts and minerals could be used in practicing the invention but the above set forth list represents typical materials of the sort which are readily available and accessible. By the expression "oxidic derivative" is meant either the free oxide of the Group IIIA element or a complex of the free oxide with a basic metal oxide. Such complexes are commonly thought of as the basic metal salt of the oxygen acid of the Group IIIA element. Thus, in preparing the boron and aluminum nitrides in accordance with the present invention, the oxidic derivative would be made up of the class consisting of boric oxide, aluminum oxide and their basic metal complexes, to wit, a basic metal borate and a basic metal aluminate. The expression "basic metal" includes those metals of the alkaline earth series and alkali metal series and these have previously been defined elsewhere herein.

It will be observed that the molar ratio of the boric oxide to cyanide is 1 to 2. Thus, when the source of cyanide is an alkali metal cyanide, e.g., sodium cyanide, at least two moles are needed to react with one mole of boric oxide. On the other hand, in the event that an alkaline earth salt such as calcium cyanamide is employed, only one mole is needed since its formula contains the equivalent of two CN groups. When the basic metal borates constitute the source of boron, they are employed in quantities sufficient to provide the requisite number of boric oxide equivalents. The aforesaid relationships are illustrated in the equations below:

(1) $B_2O_3+2NaCN+SiO_2 \rightarrow Na_2SiO_3+2BN+2CO$ (2) $CaO \cdot 3B_2O_3+6NaCN+4SiO_2 \rightarrow CaSiO_3 +3Na_2SiO_3+6BN+6CO$ (3) $B_2O_3+CaCN_2+SiO_2 \rightarrow CaSiO_3+2BN+CO_2$ (4) $Na_2O \cdot 2B_2O_3+4NaCN+3SiO_2 \rightarrow 3Na_2SiO_3 +4BN+4CO$ Reference is now made to the following examples, the purpose of which is to illustrate the process in greater detail, although those skilled in the art to which the said invention pertains will appreciate that such examples are not to be construed as limiting or otherwise restricting the invention or departing from the spirit or scope thereof.

EXAMPLE 1

1.85 moles of boric oxide, 5 moles of silica and 8 moles of sodium cyanide which have been previously dried are heated in a nickel crucible for 4 hours at 800° C. After cooling, the residue was leached in boiling water for a period of 4 hours and the so-obtained boron nitride filtered off and dried. The yield of the product amounted to 73%.

EXAMPLE 2

2.8 moles of boric oxide, 2.8 moles of silica and 11.1 moles of potassium cyanide, all of which had been previously dried were heated in a nickel vessel for 1 hour at 1050° C. The boron nitride was separated in the manner described under Example 1. The yield was 87%.

EXAMPLE 3

1.3 moles of colemanite ($2CaO \cdot 3B_2O_3$), 5.0 moles of silica and 4 moles of calcium cyanide, which components had previously been dried, were placed in a zircon crucible and heated for 4 hours at a temperature of 1350° C. The yield of boron nitride isolated with the procedure of Example 1 amounted to 90%.

EXAMPLE 4

0.9 mole of boric oxide, 2.0 moles of silica and 3.6 moles of sodium cyanide, after being dried, were heated for 4 hours at 1350° C. Employing the isolation procedure as given in Example 1, there was obtained a quantitative yield of boron nitride.

As previously explained elsewhere herein, the process of our invention is applicable to preparation of nitrides of Group IIIA elements. In general, the nitride is obtained by reacting the oxidic derivative of the particular element with a basic metal cyanide or cyanamide in accordance with the procedures as above given for boron nitride. The example below illustrates the preparation of a nitride wherein the metallic element thereof is aluminum.

EXAMPLE 5

*Aluminum nitride*

3.9 moles of alumina ($Al_2O_3$), 8 moles of silica and 8 moles of sodium cyanide, after previous drying, were placed in a nickel crucible and heated for 4 hours at 1050° C. The aluminum nitride was obtained in a yield of 91%.

We claim:

1. A process of producing the nitride of an element of Group IIIA of the Periodic System selected from the class consisting of aluminum and boron which comprises heating at a temperature ranging from about 800° C. to about 1350° C. in the presence of silica and under a non-oxidizing atmosphere, one oxidic equivalent of the element including the basic metal aluminate and borate equivalents thereof with a basic metal salt selected from the class consisting of basic metal cyanamides and cyanides the quantity of basic metal salt being sufficient to provide at least 1 equivalent of cyanide and isolating the so-formed nitride by leaching out the reaction by-products.

2. A process of producing boron nitride which comprises heating at a temperature ranging from about 800° C. to about 1350° C. in the presence of silica and under a non-oxidizing atmosphere one equivalent of an oxidic derivative of boron selected from the class consisting of boric oxide and its basic metal aluminate and borate equivalent with a basic metal salt selected from the class consisting of cyanamides and cyanides the quantity of basic metal salt being sufficient to provide at least two equivalents of cyanide and isolating the so-formed boron nitride by leaching out the reaction by-products.

3. The process according to claim 2 wherein the oxidic derivative of boron is boric oxide.

4. The process according to claim 2 wherein the oxidic derivative of boron is anhydrous borax.

5. The process according to claim 2 wherein the oxidic derivative of boron is colemanite.

References Cited by the Examiner

UNITED STATES PATENTS

| | | | |
|---|---|---|---|
| 1,135,232 | 4/1915 | Weintraub | 23—191 |
| 2,834,650 | 5/1958 | Conant et al. | 23—191 |
| 2,839,366 | 6/1959 | Kamlet | 23—191 |

OSCAR R. VERTIZ, *Primary Examiner.*

MAURICE A. BRINDISI, *Examiner.*

J. J. BROWN, *Assistant Examiner.*